(12) United States Patent
Steudte

(10) Patent No.: US 7,157,676 B2
(45) Date of Patent: Jan. 2, 2007

(54) DEVICE WITH A COOLING UNIT FOR THERMALLY CLAMPING AND RELEASING TOOLS IN SHRINK-FIT CHUCKS

(75) Inventor: Ruediger Steudte, Denkendorf (DE)

(73) Assignee: Bilz Werkzeugfabrik GmbH & Co. KG, Ostfildern (DE)

( * ) Notice: Subject to any disclaimer, the term of this patent is extended or adjusted under 35 U.S.C. 154(b) by 63 days.

(21) Appl. No.: 11/082,563

(22) Filed: Mar. 17, 2005

(65) Prior Publication Data

US 2005/0204552 A1    Sep. 22, 2005

(30) Foreign Application Priority Data

Mar. 20, 2004    (DE) .................. 20 2004 004 424 U

(51) Int. Cl.
*H05B 6/14* (2006.01)
*B23B 31/117* (2006.01)
*B25G 3/10* (2006.01)

(52) U.S. Cl. ....................... 219/635; 219/632; 219/647; 279/158; 29/800

(58) Field of Classification Search ................ 219/632, 219/635, 647; 279/158; 29/800
See application file for complete search history.

(56) References Cited

U.S. PATENT DOCUMENTS

| 4,625,090 A | * | 11/1986 | Pfaffmann et al. ........... 219/644 |
| 6,161,309 A |  | 12/2000 | Cook |
| 6,588,083 B1 | * | 7/2003 | Voss et al. .................... 29/800 |
| 2001/0024020 A1 |  | 9/2001 | Rabe |
| 2003/0088972 A1 |  | 5/2003 | Haimer |
| 2004/0010897 A1 |  | 1/2004 | Taylor |

FOREIGN PATENT DOCUMENTS

| DE | 298 20 838 | 6/1999 |
| DE | 100 25 004 A1 | 11/2001 |
| JP | 2002079426 | 3/2002 |

* cited by examiner

*Primary Examiner*—Philip H. Leung
(74) *Attorney, Agent, or Firm*—Michael J. Striker

(57) ABSTRACT

A device (10) for thermally clamping and releasing tools (11) in shrink-fit chucks (12), having a socket (15) for a shrink-fit chuck (12), a heating unit (16) that can be moved toward and away from the mounted shrink-fit chuck (12), and a cooling unit (20) for cooling the heated shrink-fit chuck (12). The cooling unit (20) has at least one coolant distributor (21, 22) that is capable of moving in relation to the socket (15) with the mountable shrink-fit chuck (12), conveys a preferably fluid coolant, e.g. cooling water, and has outlets (23) for the coolant, which are oriented toward the socket (15) with the mountable shrink-fit chuck (12) and out of which the coolant travels under pressure to act on the outside of the socket (15) with the mountable shrink-fit chuck (12) for cooling purposes (FIG. 1).

24 Claims, 4 Drawing Sheets

DEVICE WITH A COOLING UNIT FOR THERMALLY CLAMPING AND RELEASING TOOLS IN SHRINK-FIT CHUCKS

CROSS-REFERENCE

The invention described and claimed hereinbelow is also described in DE 20 2004 004 424.2, filed Mar. 20, 2004. This German Patent Application, whose subject matter is incorporated here by reference, provides the basis for a claim of priority of invention under 35 U.S.C. 119 (a)–(d).

BACKGROUND OF THE INVENTION

The invention relates to a device for thermally clamping and releasing tools in shrink-fit chucks.

Devices of this kind are known (DE 10025004 A1), in which the cooling device has a special cooling adapter with an insertable, interchangeable insert that is geometrically adapted to the shape of the shrink-fit chuck used; the cooling adapter contains internal cooling conduits through which a fluid coolant, e.g. cooling water, is circulated for cooling purposes. In order to cool the shrink-fit chuck, the cooling adapter with the interchangeable insert adapted to the chuck geometry is slid onto the shrink-fit chuck. The indirect cooling achieved in this way is relatively slow, which has a negative impact on productivity. It is also necessary to store and use a specifically adapted cooling adapter for each shrink-fit chuck geometry, which entails considerable expense.

SUMMARY OF THE INVENTION

The object of the present invention is to produce a device of the type mentioned at the beginning, which costs less and permits a rapid cooling with an accompanying time savings and increase in productivity.

The device according to the present invention permits a direct cooling of the socket with the shrink-fit chuck by acting on it externally and directly with preferably fluid coolant, e.g. cooling water, which is sprayed onto it from the outside, under pressure. The cooling water is carried away again, concentrated by a guide device, and is returned to the coolant supply unit, e.g. a coolant reservoir. Acting on the socket with the shrink-fit chuck directly with fluid coolant permits a very rapid cooling and therefore represents a time savings, which results in an increase in productivity. It is also advantageous that the external application of coolant can achieve a rapid cooling of this kind for all possible shrink-fit chuck geometries, without requiring any adaptation to the chuck geometry. This further reduces costs and setup times. Moreover, operator safety is increased since after very rapid cooling, the shrink-fit chuck is cooled down to the starting temperature of the coolant again and is no longer hot, thus eliminating the potential for injury. In one embodiment of the device, the entire cooling and drying process takes only approx. 30 seconds, after which the shrink-fit chuck with the shrink-fitted tool is ready to remove. All in all, the device is simple, inexpensive, and operationally reliable.

Other details and advantages of the invention ensue from the description given below.

The full wording of the claims is not given above simply to avoid unnecessary repetition, but is instead included herein merely by reference to the claims. All of these claimed characteristics, however, are at this point held to have been expressly disclosed as essential to the invention.

All characteristics mentioned above and in the description below, as well as those characteristics that can be inferred from the drawings alone, are thus further components of the invention, even if they have not been expressly developed and in particular, are not mentioned in the claims.

DETAILED DESCRIPTION OF THE PREFERRED EMBODIMENTS

Figure 1:
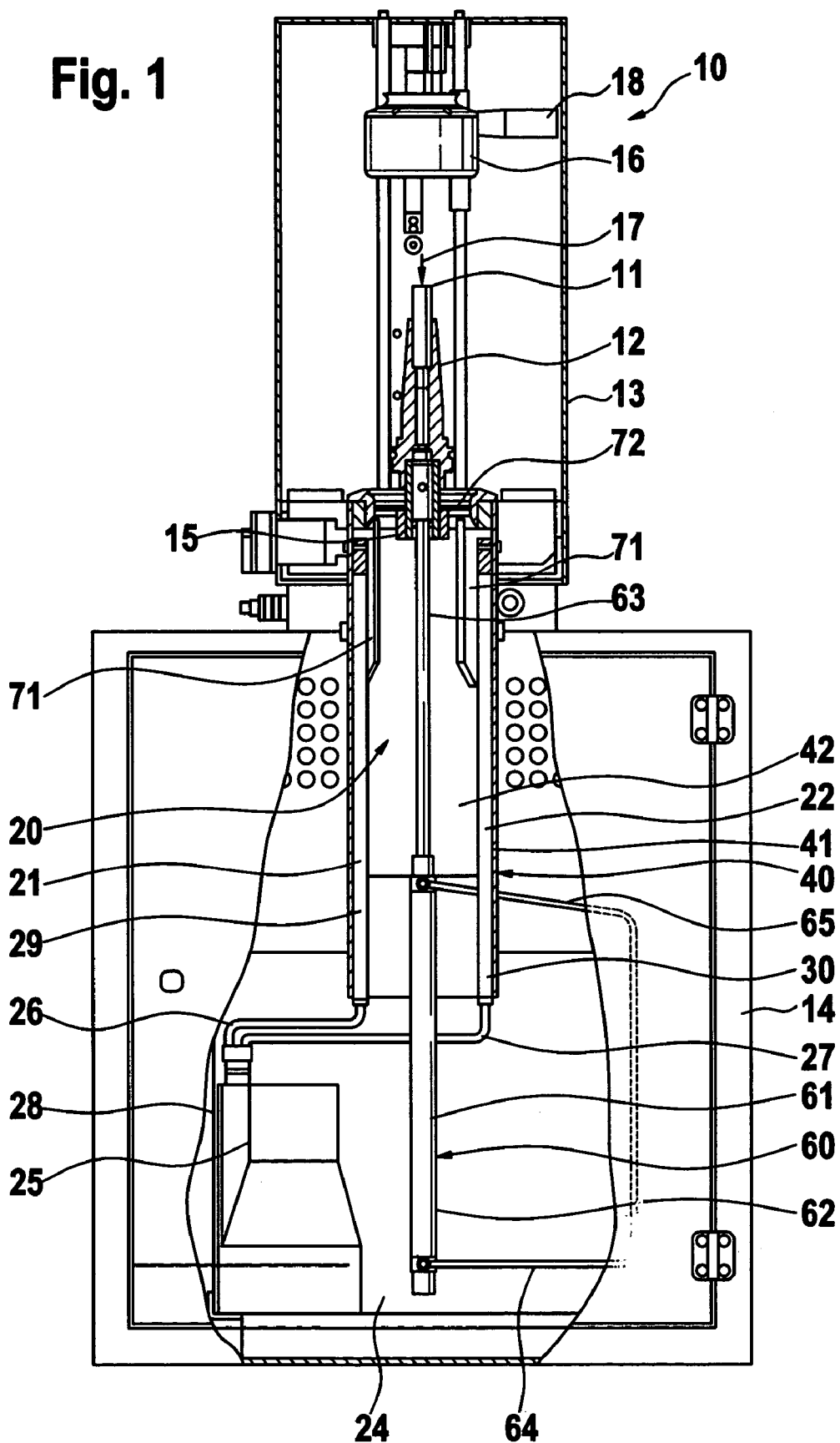
FIG. 1 shows a schematic, partially sectional side view of a device for thermally clamping and releasing tools in shrink-fit chucks, in a starting position.

The drawings show a device 10—which is also referred to as a shrink-fitting unit—in the form of an upright unit, which is used for thermally clamping and releasing tools 11 in shrink-fit chucks 12 and which makes it possible during continuous operation to clamp or release a large number of high-speed tools 11 in rapid succession as often as desired, using the shrink-fitting technique. The device 10 has an upper part 13 and a lower cabinet 14, which contains individual supply units of the. device 10. The device 10 has a socket 15 that can interchangeably accommodate a shrink-fit chuck 12. Another component of the device 10 is a heating unit 16 that can move in the arrow direction 17 toward the socket 15 with the shrink-fit chuck 16 and back away from it in the opposite direction. The heating unit 16 has a protruding handle 18 and inside, an induction coil that is not shown in detail. The handle allows the heating unit to be moved back and forth by hand in the direction of the arrow 17.

The device 10 is also provided with a cooling unit 20 that serves to cool the shrink-fit chuck 12, which has been heated in order to shrink-fit the tool 11 into place. The cooling unit 20 has at least one coolant distributor 21, 22, which can move in relation to the socket 15 with the mountable shrink-fit chuck 12 and conveys a preferably fluid coolant, e.g. cooling water. In the exemplary embodiment shown, two identically functioning coolant distributors 21 and 22 are provided. For the sake of simplicity, other details relating to them will only be explained in connection with the one coolant distributor 21. The coolant distributor 21 has outlets 23 for the coolant, which are oriented toward the socket 15 with the mountable shrink-fit chuck 12. When the cooling unit 20 is switched on, the coolant that is conveyed inside the coolant distributor 21 and/or 22 travels out of the outlets 23 under pressure and acts on the socket 15 with the mountable shrink-fit chuck 12 externally to cool it. If the coolant is comprised e.g. of cooling water, then it is sprayed out from the outlets 23 and onto the socket 15 and in particular, the shrink-fit chuck 12, to cool them.

The at least one coolant distributor 21, 22 is integrated into a coolant circuit that can be closed and contains a coolant supply unit 24, e.g. with a coolant pump 25, to which the at least one coolant distributor 21, 22 is connected, e.g.

by means of a supply line 26 or 27. The coolant supply unit 24 has a coolant reservoir 28 that is embodied in the form of a collecting tank that is contained in the lower cabinet 14 and is embodied as a tank for containing the downward-flowing coolant that has been used to act on the socket 15 with the mountable shrink-fit chuck 12. For example, the coolant pump 25 is embodied in the form of an immersion pump with a filter and is contained inside the coolant reservoir 28.

The device 10 also has at least one guide device 40, which, for cooling purposes, can be moved into a guide position relative to the socket 15 with the mountable shrink-fit chuck 12, in which the guide device 40 encompasses the socket 15 with the mountable shrink-fit chuck 12. The guide device 40 serves to guide the coolant and serves as a shield to prevent the coolant, in particular cooling water, from spraying in random directions. The guide device 40 is connected to the coolant supply unit 24, in particular the coolant reservoir 28, in such a way that the guide device 40 feeds into the latter. In an exemplary embodiment that is not shown, the at least one coolant distributor 21, 22 can be incorporated into the guide device 40 and constitute a component of it. In the exemplary embodiment shown, the at least one coolant distributor 21, 22 is embodied as a separate component and is contained inside the guide device. It is comprised of a guiding component 29 and 30, in particular a tube, whose wall 31 has outlets 23 for the coolant embodied in it in the form of wall openings, e.g. bores. The at least one coolant distributor 21, 22 can be comprised of at least one annular segment or closed annular component. In the exemplary embodiment shown, it is comprised of a linear part that extends roughly parallel to thecentral longitudinal axis 32—of the socket 15. The at least one coolant distributor 21, 22 can be embodied as capable of moving in relation to the socket 15 with the mountable shrink-fit chuck 12. But in the exemplary embodiment shown, the at least one coolant distributor 21, 22 is embodied in the form of a stationary component of the device 10 and is fastened, for example, to the inside of the guide device 40. The socket 15 with the mountable shrink-fit chuck 12, however, can move in relation to the stationary coolant distributor 21, 22 in order to be cooled, traveling either toward its operating region or away from its operating region.

The guide device 40 has a tube 41 coaxial to the socket 15, which encloses an inner annular chamber 42. For cooling, the socket 15 with the mountable shrink-fit chuck 12 can be moved into and out of the annular chamber 42, roughly in the direction of the central longitudinal axis 32. As is clear in particular from FIGS. 3 and 4, the at least one coolant distributor 21, 22 is contained inside the tube 41 and fastened to it. It extends approximately axially parallel to the tube 41. In the embodiment with two coolant distributors 21, 22, these can be positioned in the tube 41 in accordance with FIG. 3, at approximately equal intervals of circumference angle from one another, e.g. diamietrically opposite from each other.

Figure 3:
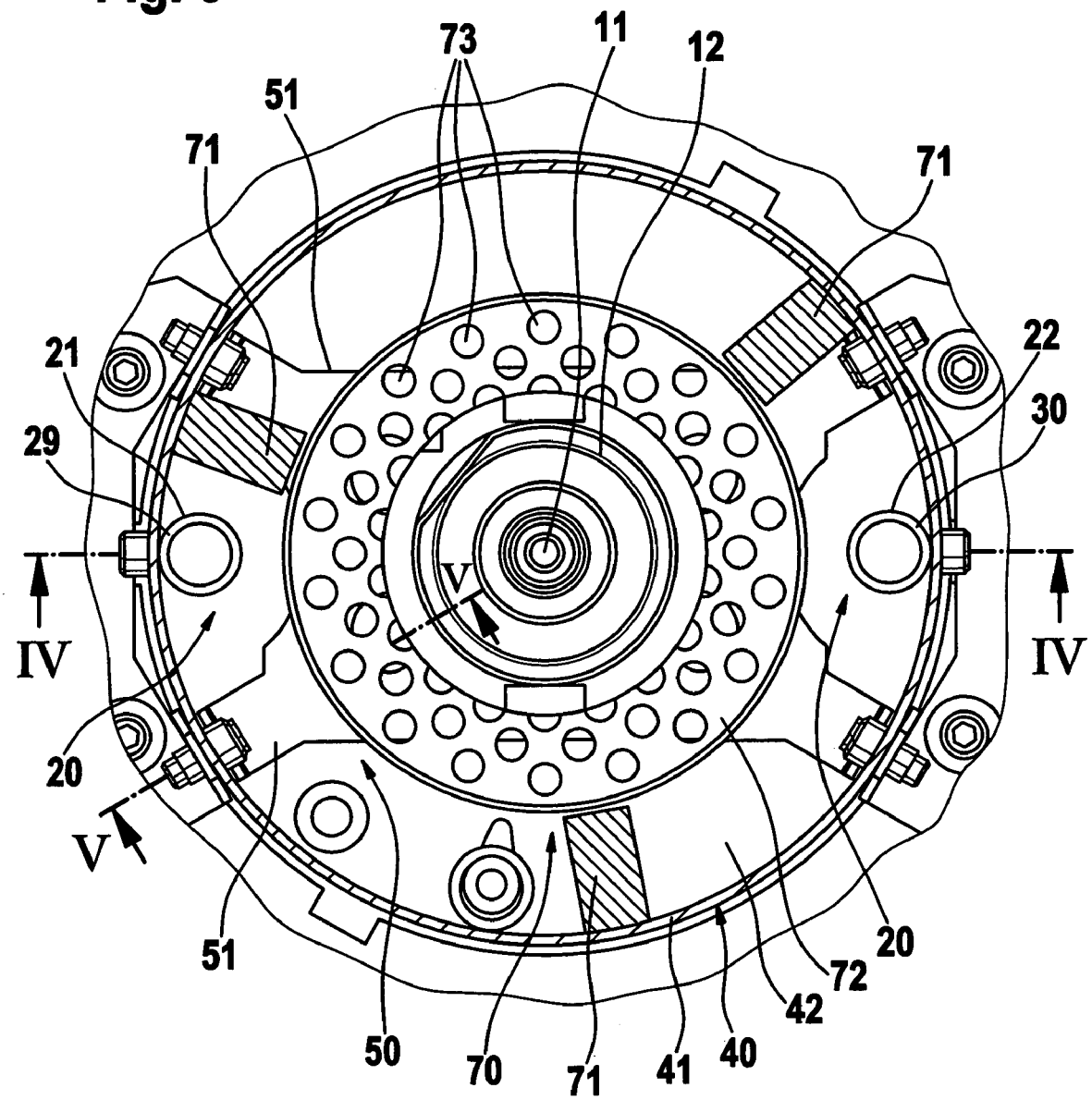
FIG. 3 shows a schematic, partially sectional top view of parts of the device in FIG. 1.
Figure 4:
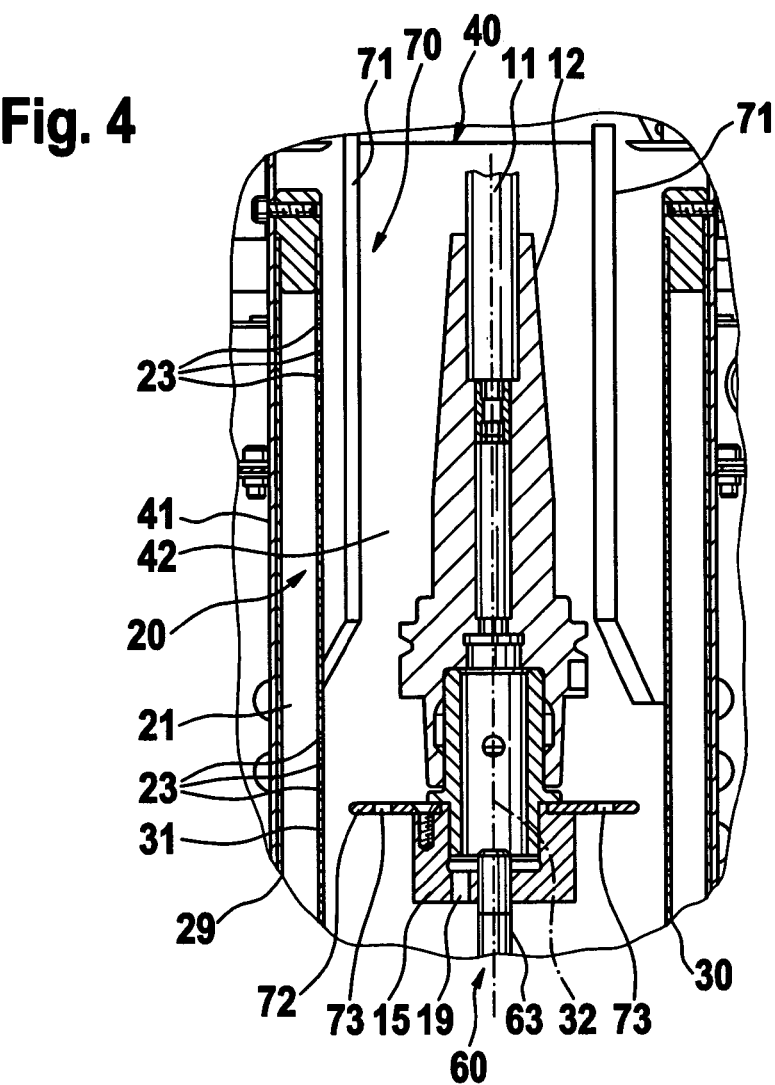
FIG. 4 shows a schematic section through a part of the device in the direction of the arrow IV—IV in FIG. 3.
Figure 5:
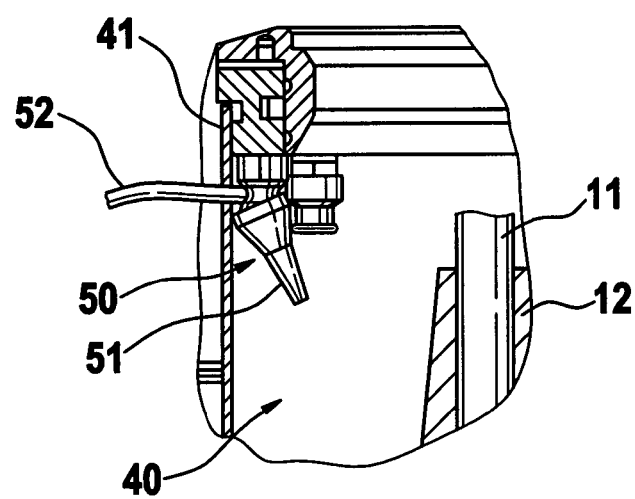
FIG. 5 shows a schematic section through a part of the device in the direction of the arrow V—V in FIG. 3.

As is particularly clear from FIGS. 3 and 5, the device 10 is also provided with a blower 50, which can be supplied by a compressed gas source, not shown, in particular a compressed air source, e.g. in the form of a compressed air system. The blower 50 has at least one blast nozzle 51, several of which, e.g. four, are positioned in the tube 41 at uniform intervals of circumference anglo from one another, as shown in FIG. 3. The at least one blast nozzle 51 is oriented at a downwardly inclined angle and points toward the mountable shrink-fit chuck 12 in the socket 15. The blast nozzle 51 can be supplied with compressed gas, e.g. compressed air, via a schematically depicted supply line 52 in order to blast away coolant, e.g. cooling water, adhering to the surface of the socket 15 with the mountable shrink-fit chuck 12. In FIG. 5, it is clear that the blower 50, in particular the at least one blast nozzle 51, is positioned at the upper end of the guide device 40, in particular the upper end of the tube 41.

A drive unit 60 can move the socket 15 for the shrink-fit chuck 12 in the direction of its central longitudinal axis 32. The drive unit 60 has a translational drive mechanism aligned approximately coaxial to the central longitudinal axis 32; this translational drive mechanism is driven, for example, by means of hydraulic fluid and in particular, is comprised of a pneumatic cylinder 61 with a stationary cylinder housing 62 and a piston rod 63, which can move in relation to the cylinder housing and whose upper end in the drawings acts on the socket 15. The pneumatic cylinder 61 has connecting lines 64 and 65 via which it can be connected to a compressed air source, e.g. a compressed air system. For example, the connecting line 64 supplies compressed air for extending the piston rod 63 upward, whereas the connecting line 65 supplies compressed air for retracting the piston rod 63 downward.

Figure 2:
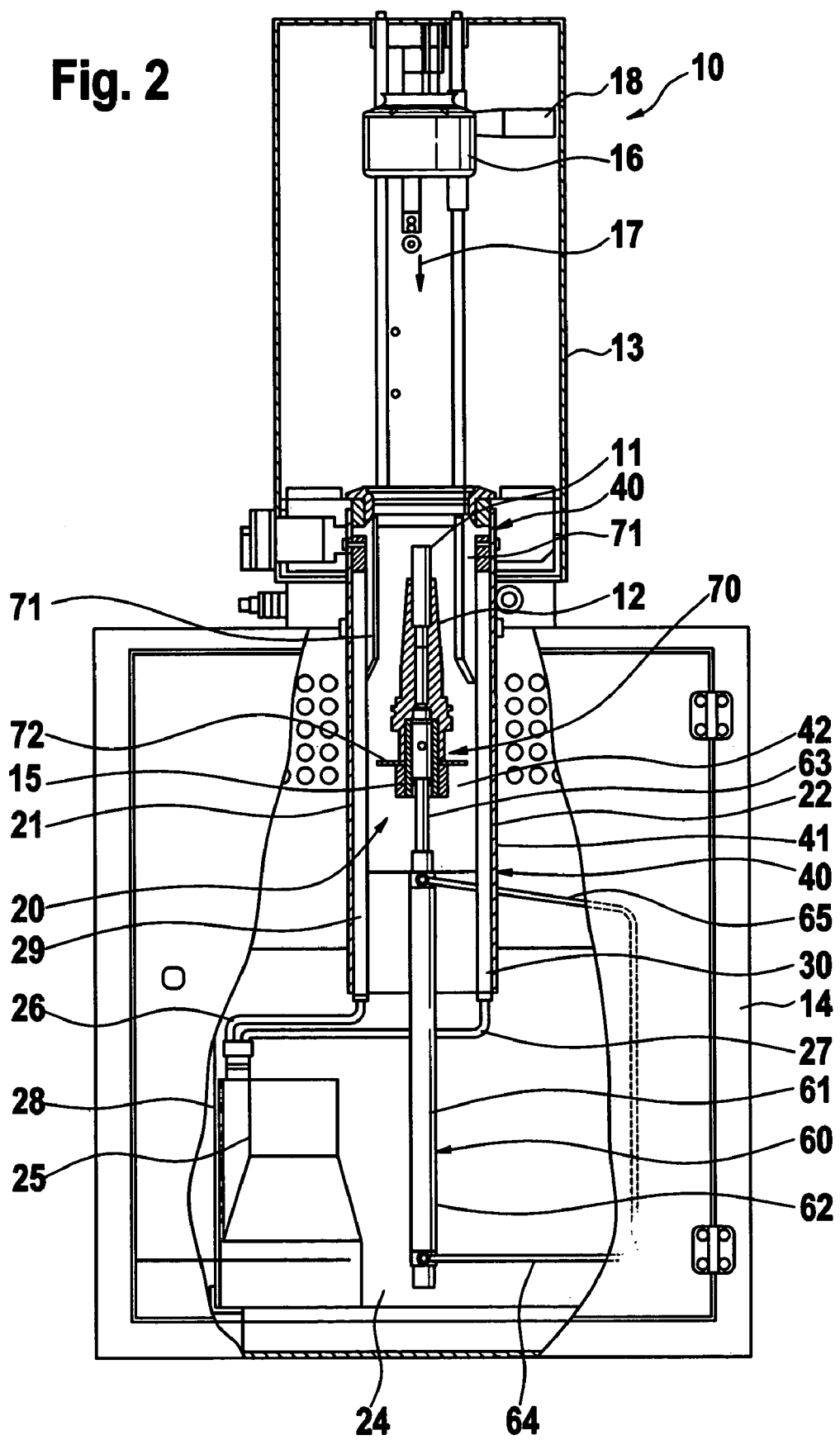
FIG. 2 shows a schematic, partially sectional side view of the device in FIG. 1, but in which the socket with the shrink-fit chuck and tool has been moved downward out of the starting position in FIG. 1.

In FIG. 1, the piston rod 63 of the drive unit 60 is extended upward, as a result of which the socket 15 for the shrink-fit chuck 12 has been brought into a starting position in which the shrink-fit chuck 12 with the inserted tool 11 can be placed onto the socket 15 from above. In this starting position, the heating unit 16 is manually lowered by grasping the handle 18 and moving it in the arrow direction 17 until the pole piece, not shown, of the at least one induction coil in the heating unit 16 rests on the upper part of the shrink-fit chuck 12 that contains the tool 11. In this position of the heating unit 16, the coil can be clamped in position, e.g. electromagnetically. The inductive shrink-fitting of the tool 11 into the shrink-fit chuck 12 is then executed in this starting position. Then, through actuation of the pneumatic cylinder 61, the socket 15 with the shrink-fit chuck 12 can be moved slowly out of this starting position, down into the operating region of the at least one coolant distributor 21, 22. The coolant pump 25 supplies the coolant distributor 21, 22 with a corresponding amount of coolant, which is sprayed out of the outlets 23 so that as the socket 15 with the shrink-fit chuck 12 is lowered, it is sprayed with this coolant and thus cooled. After a short time, e.g. on the order of only 20 seconds, the socket 15 with the shrink-fit chuck 12 is lowered into the lowermost position as depicted in FIG. 2, whereupon the pneumatic cylinder 61 reverses direction so that its piston rod 63 now travels upward in the opposite direction, thus moving the socket 15 with the shrink-fit chuck 12 upward. In the process of this movement, the blower 50 is activated so that its downward facing blast nozzles 51 act on the socket 15 with the shrink-fit chuck 12 so that compressed gas, in particular compressed air, blasts away any coolant adhering to the socket 15 and the shrink-fit chuck 12. The coolant dripping down is conveyed by the guide device 40 and travels downward from it into the coolant supply unit 24, in particular into the coolant reservoir 28. If the rising piston rod 63 has brought the socket 15 with the shrink-fit chuck 12 back into the starting position according to FIG. 1, then the shrink-fit chuck 12 can be removed. The entire cycle is completed in a short time, e.g. in approximately 30 seconds, whereupon the shrink-fit chuck 12 with the tool 11 can be grasped by hand and carried away. The shrink-fit chuck 12 is cold and is roughly the temperature of the cool coolant, thus eliminating the need for it to be touched while hot. The coolant 20 produces a very rapid cooling of the socket 15 with the shrink-fit chuck 12, which represents a time savings that increases productivity. It is also advantageous that the cooling unit 20 can use direct water cooling to cool shrink-fit chucks 12 with all possible geometries, without requiring adapter elements for various chuck geometries. This significantly reduces costs and achieves further time savings. Since the shrink-fit chuck 12 is no longer hot and is ready to be held even after a short cooling period, this increases operational safety.

The device 10 has guiding means 70 between the socket 15 with the mountable shrink-fit chuck 12 on the one hand and the guide device 40, in particular its tube 41, on the other. The guiding means 70 can radially support and guide the socket 15 with the mountable shrink-fit chuck 12 in relation to the guide device 40, in particular the tube 41, for at least part of the way during the movement away from the starting position and back into the starting position. The guiding means 70 are comprised on the one hand of longitudinally extending guide pieces 71, e.g. provided on the guide device 40, in particular the tube 41, and on the other hand, of a circular centering plate 72, e.g. provided on the socket 15. During the movement, the centering plate 72 is supported between the guide pieces 71 in the radial direction and is linearly guided along the guide pieces 71 in the axial direction. In particular to allow the coolant to pass through, the centering plate 72 and/or the socket 15 for the shrink-fit chuck 12 is/are provided with through openings 73 and 19, respectively, through which the coolant can drain away.

The invention claimed is:

1. A device for thermally clamping and releasing tools (11) in shrink-fit chucks (12), comprising:
    a socket (15) for a shrink-fit chuck (12);
    a heating unit (16) that is adapted to move toward and away from a mounted shrink-fit chuck (12);
    a cooling unit (20) for cooling the heated shrink-fit chuck (12), wherein the cooling unit (20) has at least one coolant distributor (21, 22), wherein the at least one coolant distributor (21, 22) is adapted to move in relation to the socket (15) with the mountable shrink-fit chuck (12), conveys a fluid coolant, and has outlets (23) for the coolant, wherein the outlets are oriented toward the socket (15) with the mountable shrink-fit chuck (12) and wherein the coolant travels out of the outlets under pressure to act on the outside of the socket (15) with the mountable shrink-fit chuck (12) for cooling purposes;
    wherein the at least one coolant distributor (21, 22) is embodied as a separate component and is located inside at least one guide device (40); and
    guiding means (70) for the socket (15) with the mountable shrink-fit chuck (12), wherein by means of said guiding means (70), the socket (15) with the mountable shrink-fit chuck 12 is radially supportable and guidable for at least part of the way during movement away from a starting position and back into the starting position in relation to the at least one guide device (40).

2. The device as recited in claim 1, wherein the at least one coolant distributor (21, 22) is integrated into a coolant circuit that has a coolant supply unit (24) in the form of a coolant pump (25), to which the at least one coolant distributor (21, 22) is connected by means of a supply line (26, 27).

3. The device as recited in claim 2, wherein the coolant supply unit (24) has a coolant reservoir (28) embodied in the form of a collecting tank to contain the coolant used to act on the socket (15) with the mountable shrink-fit chuck (12).

4. The device as recited in claim 2, wherein the coolant pump (25) is embodied in the form of an immersion pump and is contained in a coolant reservoir (28).

5. The device as recited in claim 1, wherein the at least one guide device (40) for the coolant is moveable in relation to the socket (15) with the mountable shrink-fit chuck (12), into a guiding position encompassing this socket and spaced apart from it, and is connected to the coolant supply unit (24).

6. The device as recited in claim 5, wherein the at least one guide device (40) for the coolant is connected to a coolant reservoir (28).

7. The device as recited in claim 1, wherein the at least one coolant distributor (21, 22) is comprised of a guiding component (29, 30) in the form of a tube, whose wall (31) has outlets (23) for the coolant in the form of wall openings.

8. The device as recited in claim 1, wherein the at least one coolant distributor (21, 22) is comprised of at least one annular segment, closed annular component, or linear part.

9. The device as recited in claim 1, wherein the at least one coolant distributor (21, 22) is embodied in the form of a stationary component of the device (10) and the socket (15) with the mountable shrink-fit chuck (12) is capable of moving in relation to the stationary coolant distributor (21, 22) in order to be cooled, by moving either toward its operating region or away from its operating region.

10. The device as recited in claim 1, wherein the at least one guide device (40) has a coaxial tube (41) with an internal annular chamber (42) and the socket (15) with the mountable shrink-fit chuck (12) is capable of being moved into the annular chamber (42) to be cooled and then out of the annular chamber (42).

11. The device as recited in claim 10, wherein the at least one coolant distributor (21, 22) is contained inside the tube (41).

12. The device as recited in claim 10, wherein the at least one coolant distributor (21, 22) is fastened to the inside of the tube (41).

13. The device as recited in claim 10, wherein the at least one coolant distributor (21, 22), in its tubular embodiment extends approximately axially parallel to the tube of the at least one guide device (40).

14. The device as recited in claim 1, wherein the cooling unit (20) has at least two coolant distributors (21, 22).

15. The device as recited in claim 14, wherein each coolant distributor (21, 22) is embodied in the form of a tube and the tubes are positioned inside the guide device (40) at approximately uniform intervals of circumference angle from each other.

16. The device as recited in claim 1, characterized by means of a blower (50) that is capable of being supplied by a compressed gas source in the form of a compressed air source, and is equipped with at least one blast nozzle (51), wherein said at least one blast nozzle is oriented toward the mountable shrink-fit chuck (12) in the socket (15) and is supplied with compressed gas in the form of compressed air, to blast away coolant adhering to the socket (15) with the mountable shrink-fit chuck (12).

17. The device as recited in claim 16, wherein the at least one blast nozzle (51) is situated at the upper end of the at least one guide device (40) at the upper end of the tube (41).

18. The device as recited in claim 16, wherein the blower (50) is equipped with several blast nozzles (51) situated at uniform intervals of circumference angle from one another.

19. The device as recited in claim 16, wherein the at least one blast nozzle (51) is oriented at a downwardly inclined angle.

20. The device as recited in claim 1, wherein a drive unit (60) is capable of moving the socket (15) for the shrink-fit chuck (12) in the direction of its central longitudinal axis (32).

21. The device as recited in claim 20, wherein the drive unit (60) is equipped with a translational drive mechanism in the form of a pneumatic cylinder (61), which is aligned approximately coaxial to the central longitudinal axis (32) of the socket (15) and is operated by means of hydraulic fluid.

22. The device as recited in claim 20, wherein the socket (15) for the shrink-fit chuck (12) is moveable from a starting position, in which the shrink-fit chuck (12) is insertable and thermally clampable and releasable, into the operating region of the at least one coolant distributor (21, 22) and in the opposite direction, out of this operating region and back into the starting position.

23. The device as recited in claim 1, wherein the guiding means (70) are comprised of longitudinally extending guide pieces (71) on the tube of the at least one guide device (40), and of a circular centering plate (72) on the socket (15), and during the movement, the centering plate (72) is supported between the guide pieces (71) in the radial direction and is guided in linear fashion along the guide pieces (71) in the axial direction.

24. The device as recited in claim 23, wherein the socket (15) and/or the centering plate (72) has through openings (19 and 73), to permit coolant to pass through.

* * * * *